United States Patent Office 2,911,475
Patented Nov. 3, 1959

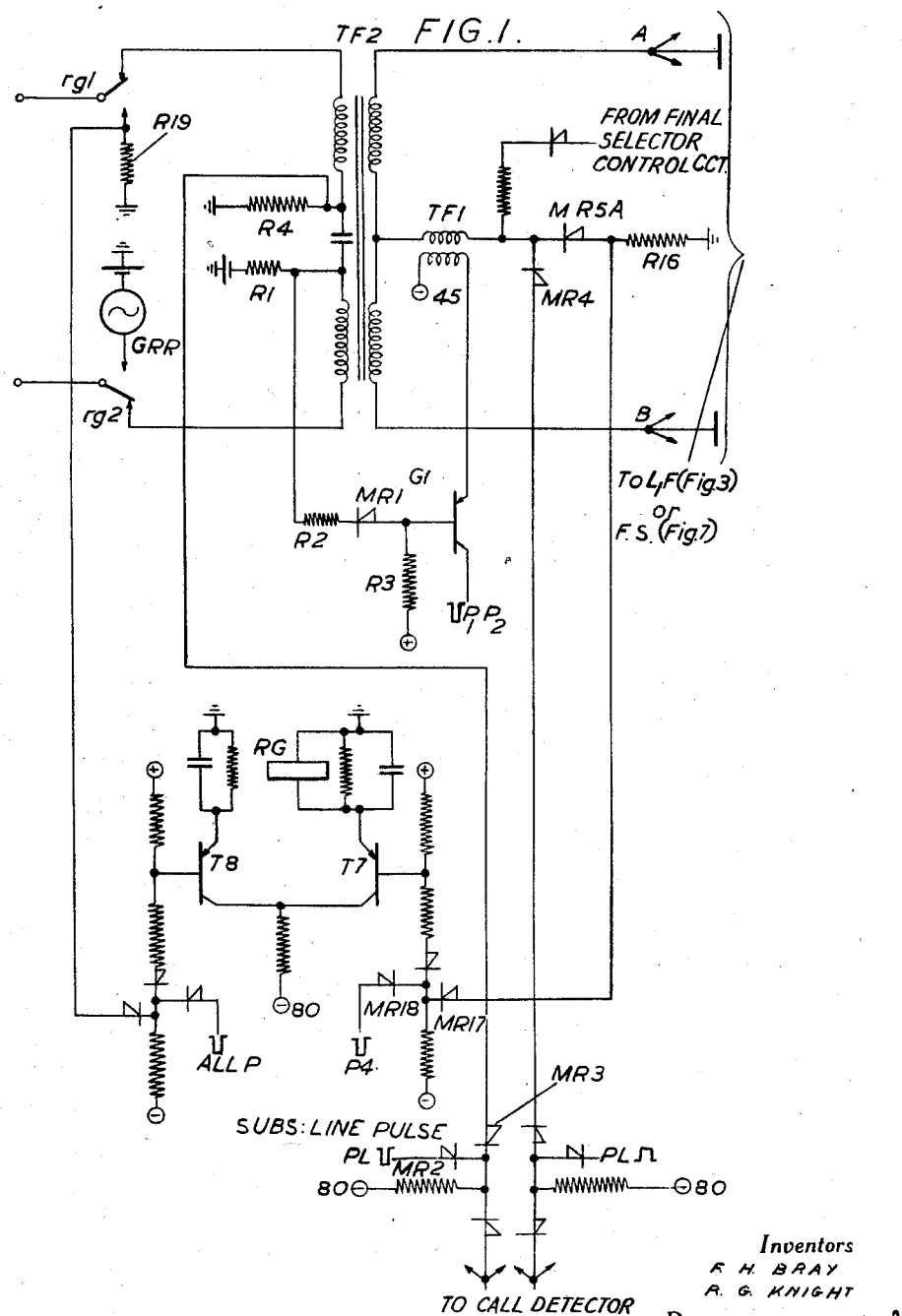

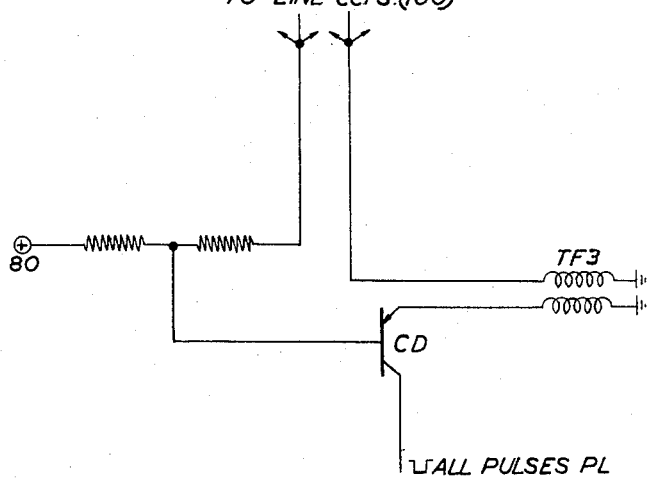
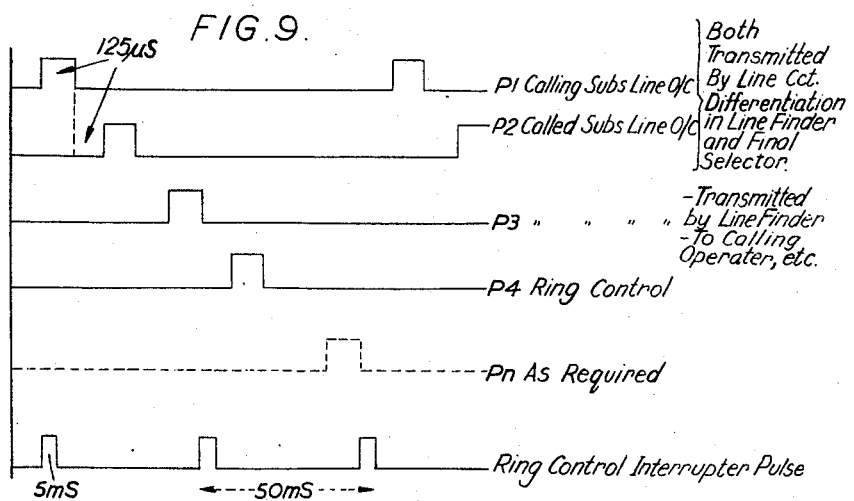

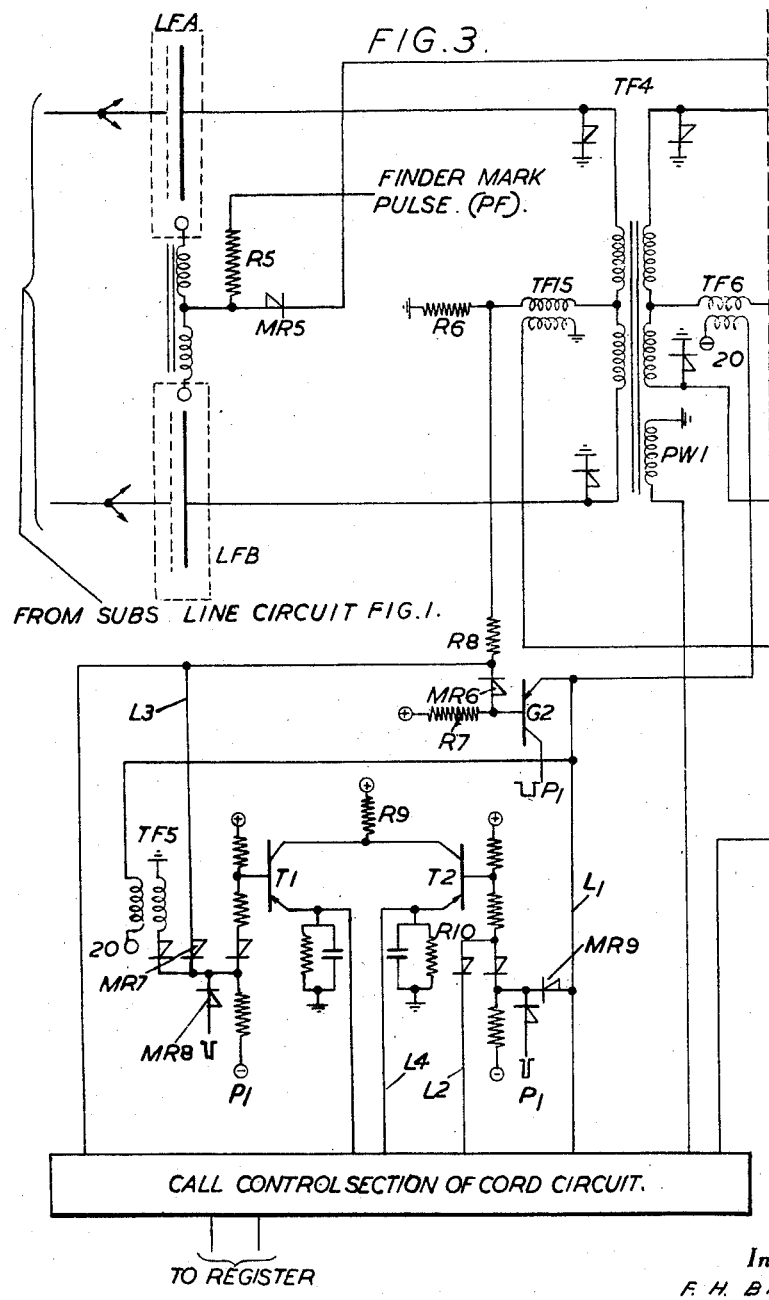

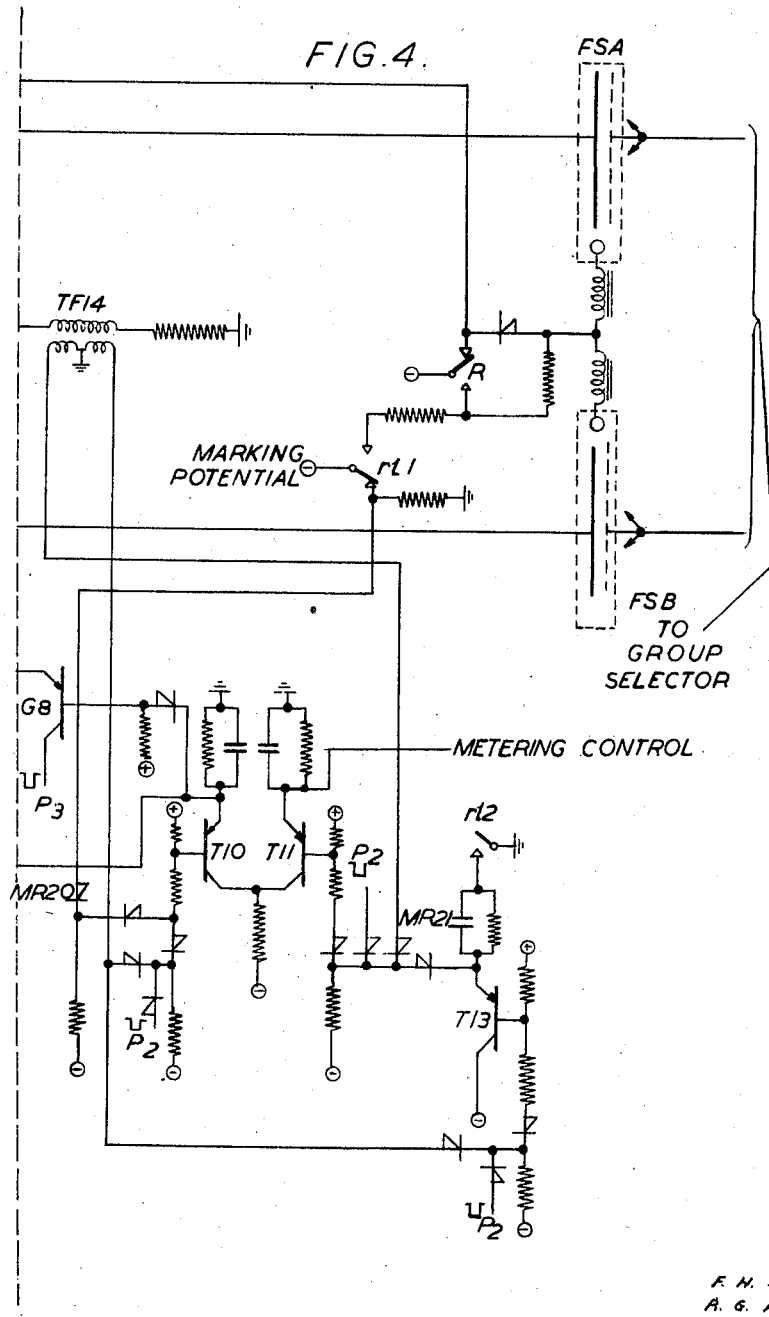

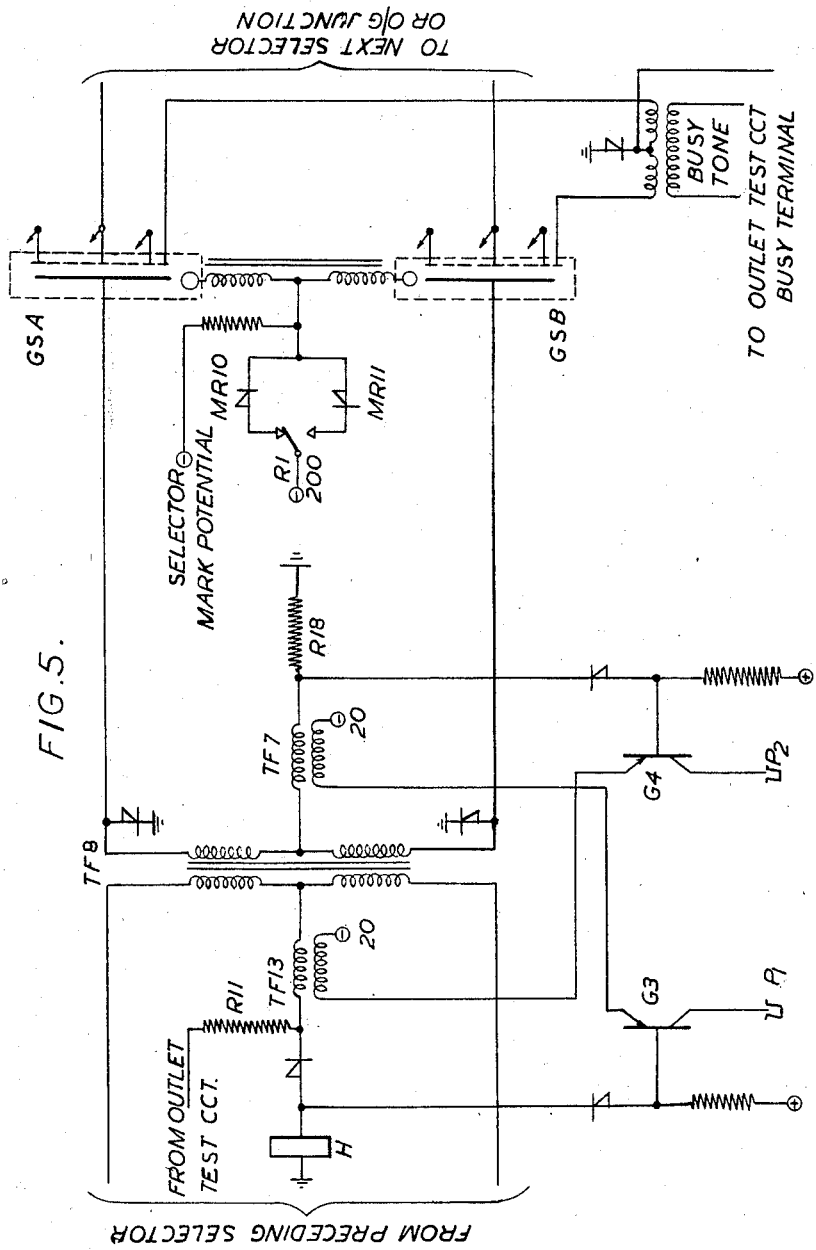

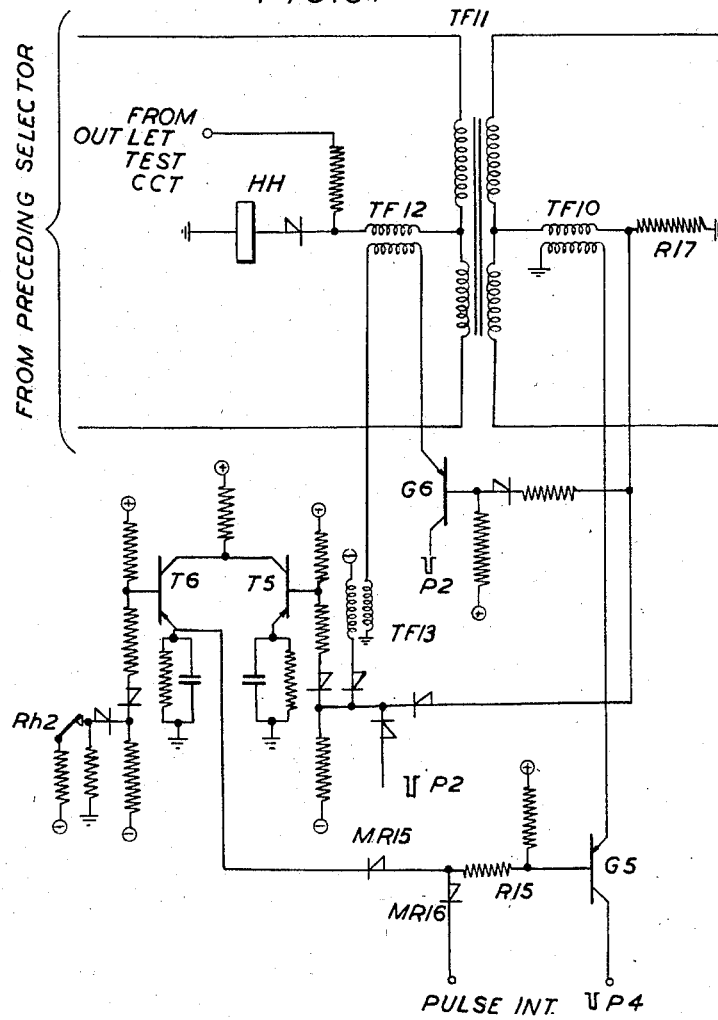

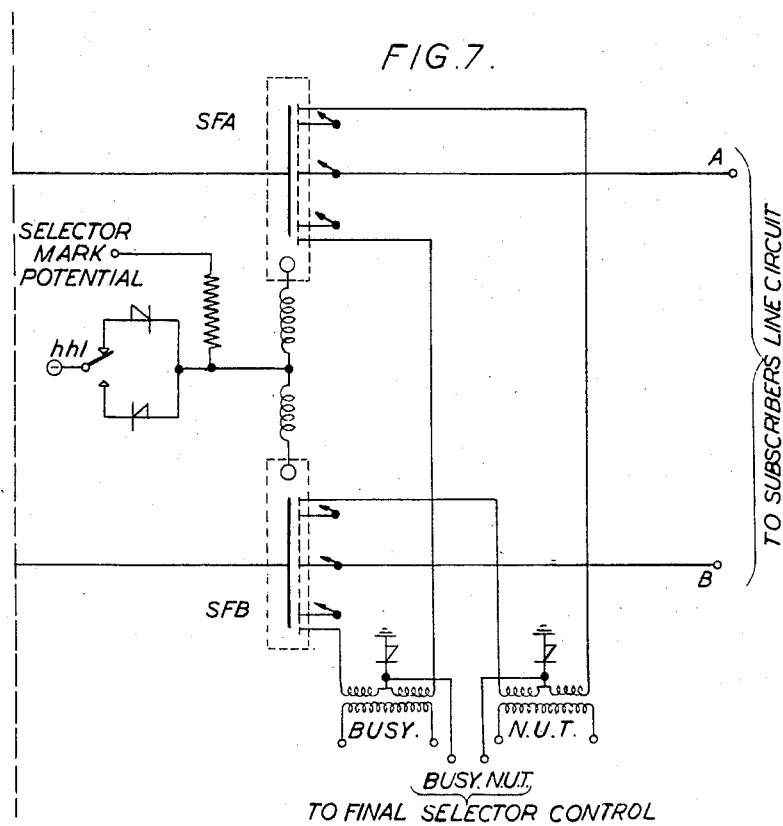

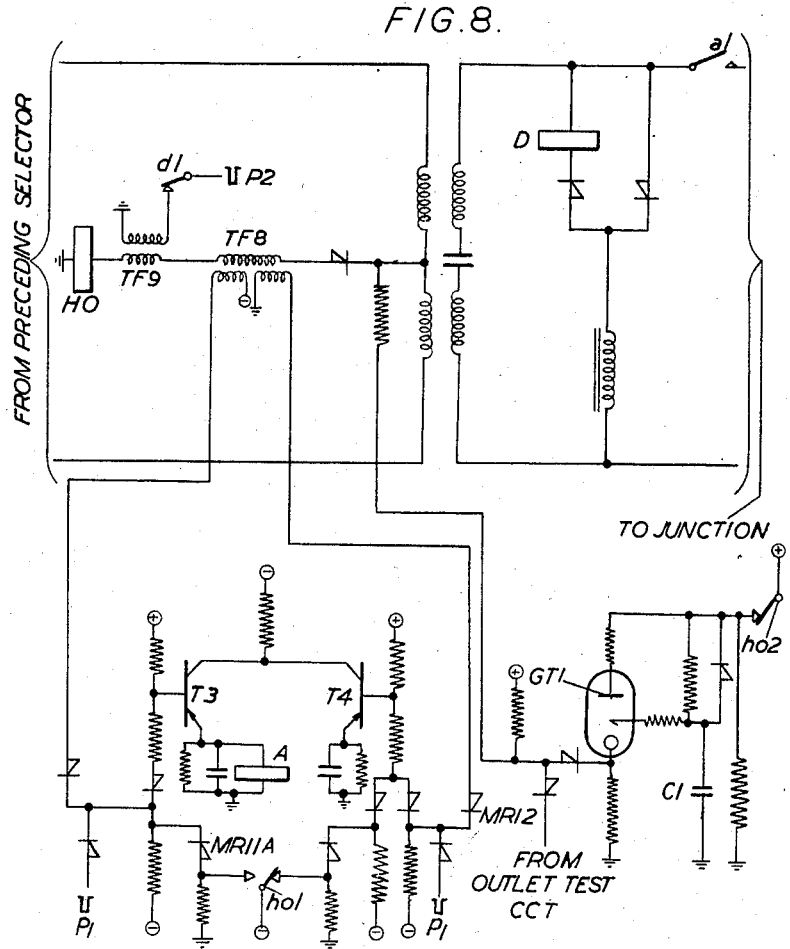

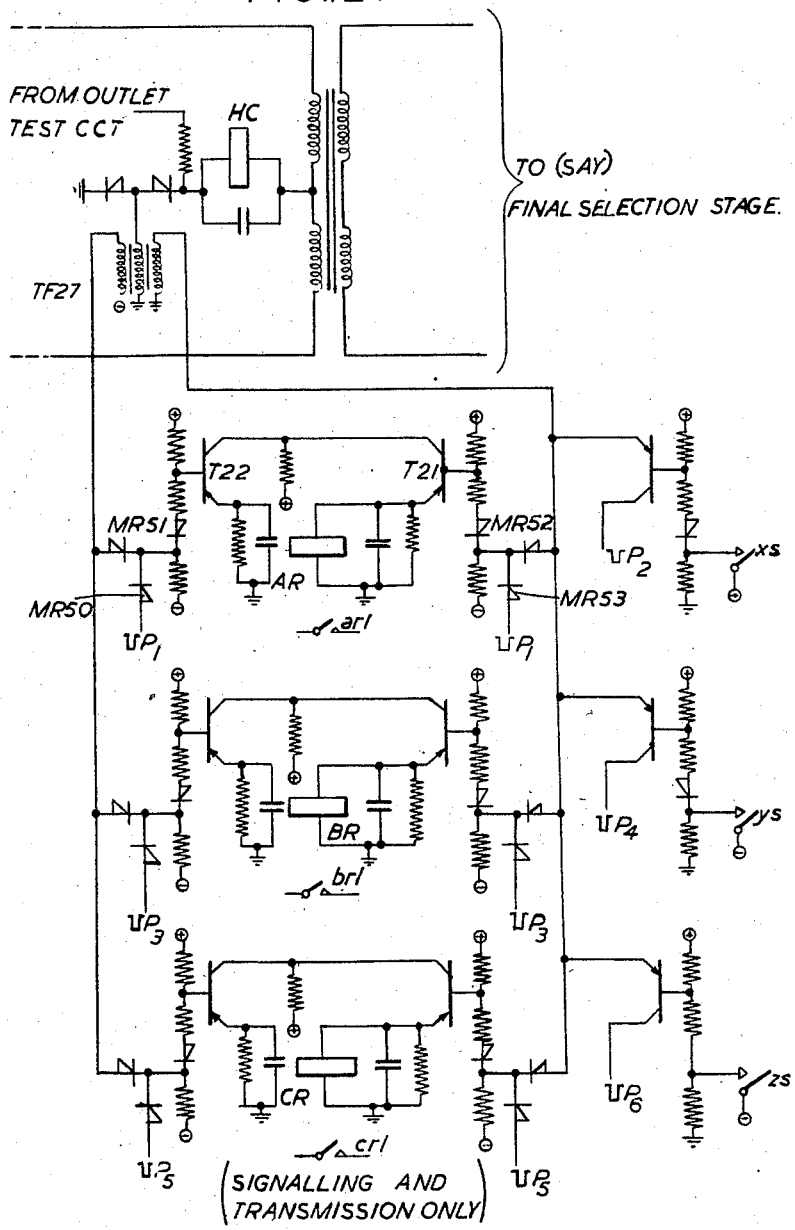

2,911,475

ELECTRICAL SIGNALLING SYSTEMS

Frederick Harry Bray and Ronald George Knight, London, England, assignors to International Standard Electric Corporation, New York, N.Y.

Application November 26, 1954, Serial No. 471,444

Claims priority, application Great Britain December 3, 1953

8 Claims. (Cl. 179—15)

The present invention relates to electrical signalling systems for use in an automatic telecommunication exchange.

It is an object of the present invention to provide a signalling system for the transmission of suprvisory and selection signals over the transmission path of an automatic telecommunication exchange system.

According to the present invention there is provided a signalling system for use in an automatic telecommunication exchange in which a number of different supervisory signals may be transmitted via the communication path, each said signal being conveyed by an electrical pulse which occupies a particular one of a number of time positions in a repetitive cycle of time positions.

The invention will now be described with reference to the accompanying drawings, in which Figs. 1 to 8 relate to a first embodiment of the invention, and Figs. 10 to 12 relate to a second embodiment of the invention. In the drawings:

Fig. 1 shows that portion of a subscriber's line circuit which is within the telephone exchange.

Fig. 2 shows a call detector gate circuit which is common to a hundred line circuits.

Figs. 3 and 4, of which Fig. 4 should be placed to the right of Fig. 3, shows a line finder, a first group selector, the cord circuit, interconnecting them, and such of the associated circuitry as is relevant to the present invention.

Fig. 5 is as much of a group selector circuit as is relevant to the present invention.

Figs. 6 and 7, of which Fig. 7 should be placed to the right of Fig. 6, shows as much of a final selector circuit as is relevant to the present invention.

Fig. 8 is as much of an out-going junction circuit as is relevant to the present invention.

Fig. 9 shows some of the pulses used in the systems.

Figure 10:
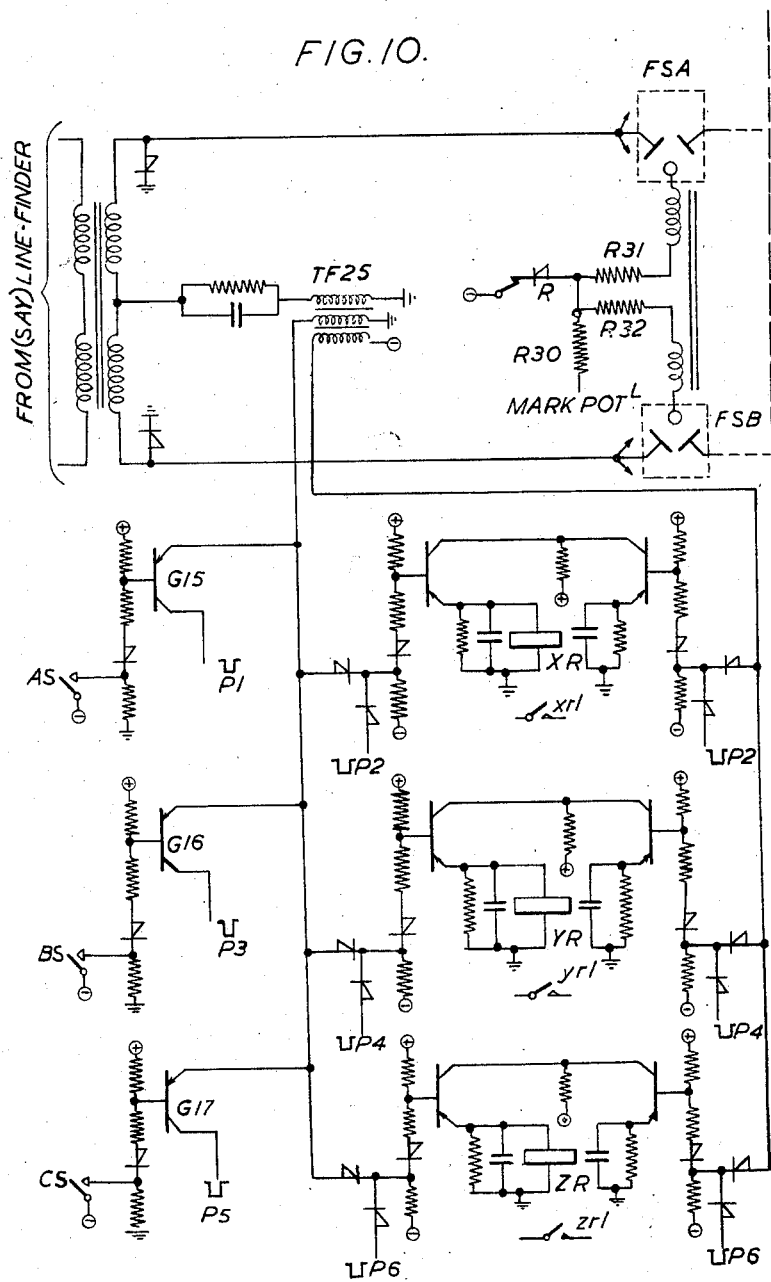

Fig. 10 shows the transmitting end of the system in the second embodiment of the invention, and such of the first selector circuit as is relevant to this invention.

Figure 11:
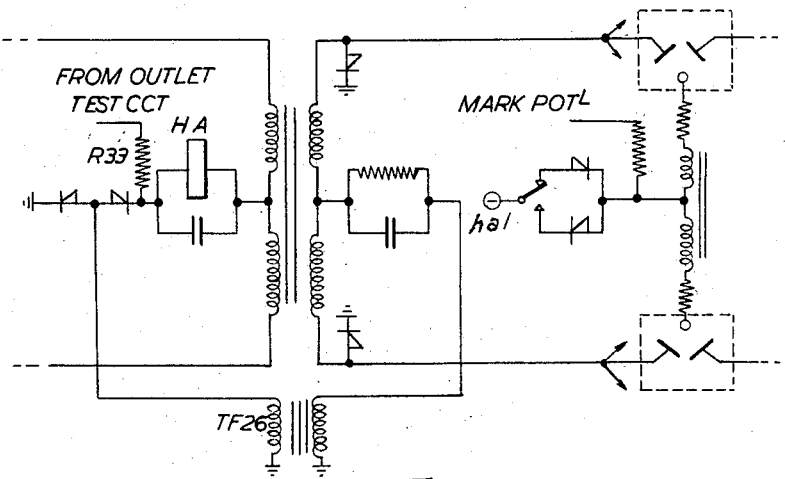

Fig. 11 is such of a typical group selector circuit as is relevant to the invention.

Fig. 12 is the receiving end of the system.

Figure 13:
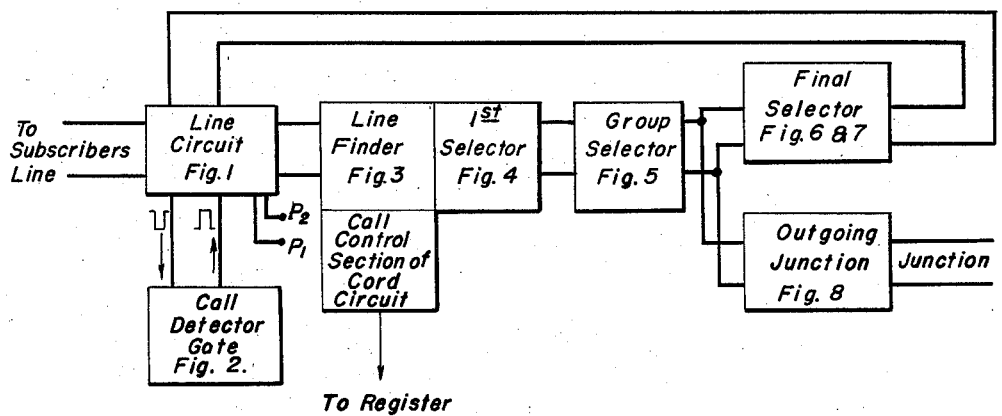

Fig. 13 is a block diagram which shows how certain of the other figures of the drawing are interconnected in the signaling system.

General introduction

The present invention is described in its application to a specific system, that of the copending application of Bray et al., Serial No. 458,934 filed September 28, 1954, and hence before describing the present invention it is desirable to describe briefly the system of the above named application. In that system the selector and line finder are cold cathode gas-filled discharge tubes, and the tubes used in the speech path are constructed in the manner described and claimed in the copending application of Beck et al., Serial No. 347,486, filed April 8, 1953. That application describes a gas tube having two anodes which are closely adjacent one to the other, and a single cathode from which the anodes are equidistant. When such a tube is conducting in both anode-cathode gaps, substantially noise-free speech transmission between the two anodes can occur. This occurs because the current flowing in the cathode circuit always remains substantially constant so that if the current flowing in one anode circuit is altered by, say, a speech input, a corresponding alteration in the opposite direction occurs in the anode circuit of the other gap.

The selectors and line finders preferably use these tubes in the form of multiple tubes having a number of such two-anode one-cathode units in a single envelope. In each tube strappings interconnect a number of anodes one from each pair of anodes. The interconnected anodes are represented in the drawing as if they were a single anode, and may conveniently be referred to as a common anode or as commoned anodes. The multiple tubes used are preferably of the type described more fully in the copending application of Beck et al., Serial No. 452,034, filed August 25, 1954. The actual selector stages would, of course, comprise several multiple tubes or a large number of single tubes. Clearly each speech path must appear in two tubes as two-wire speech paths are used. In Figs. 10 and 11 it will be seen that the speech-gap tubes of the selector are represented as if they were single units.

In the normal state when a selector is idle its tubes have a voltage between their anodes and cathodes which is insufficient to initiate a breakdown. Breakdown can only occur when the anode-cathode voltage is increased by, said 50 volts, which is conveniently effected by the application of part of the necessary increase to the common cathode on seizure and by part to the individual anode to which connection must be established. This latter operation occurs in a particular time position in a repetitive cycle which is individual to the individual anodes concerned. Thus it will be seen that the repetitive cycle of time positions is fundamental to the operation of the system.

First embodiment

In the idle condition, a subscriber's line, such as that shown in Fig. 1, is open, i.e. unlooped, so that the negative battery voltage is connected to the base of the transistor G1 over resistors R1 and R2 and rectifier Mr1. Also connected to the base of G1 is a positive potential source, this being connected via R3. Since 45 volts is connected to the emitter of G1 via the primary of transformer TF1, G1 is normally maintained in its conducting condition, i.e. the gate formed by G1 is normally open. Hence negative pulses P1 and P2, which are applied to the collector of G1, are passed through G1 to the emitter, and via TF1 are applied to the signalling circuit, which is formed by a phantom circuit over the A and B wires of the speech path. The right hand ends of these wires in Fig. 1 extend to the individual anodes of the line concerned in line finder and final selector circuits. Since these circuits are non-operative, this pulse application is ineffective.

When the subscriber lifts his receiver to make a call, the closure of the loop causes current flow from battery via R1, the windings of TF2, the loop, and R4 to earth. Hence the potential at the right-hand end of R1 goes positive, and this closes the gate, since the application of this positive potential to the base of G1 renders G1 non-conductive. The change in potential at the right-hand end of R4, a negative change, is applied to a coincidence gate including rectifiers MR2 and MR3, where it gates a negative pulse PL, which occupies a time position in a repetitive cycle which identifies the calling subscriber among those served by the same group of line finders. This pulse passes to a call detector gate, shown in Fig. 2, which gate is a transistor to the base of which this pulse is applied. The transistor CD forming this gate has its base positive with respect to its emitter in the normal state so that it is normally non-conducting. To the collector of CD are applied all PL pulses, so that when a negative PL pulse occurs on the base of CD it causes that pulse to be gated through CD. The transformer TF3 phase-inverts this pulse, so that it returns to Fig. 1 as a positive pulse. One circuit such, as Fig. 2, serves, in the system described, 100 lines which are served by a single line-finder group.

The positive pulse returned to Fig. 1 passes via a rectifier gate controlled by subscriber's line pulse PL in its positive form and via MR4 to the centre point of the secondary winding of transformer TF2. Hence it is applied to the anodes in the line-finders and final selectors individual to the caller. The line finders search for a calling line, as described in the application of Bray et al., Serial No. 458,934, filed September 28, 1954, by the application to the common cathodes of their tubes of a negative pulse whose duration covers 100 subscriber's line pulses. The line finders are thus "primed" singly and successively by these pulses PF, this occurring over resistor R5. (Fig. 3.) Hence the line finder formed by tubes LFA and LFB having access to the calling line strikes at the appropriate anode gaps. The rectifiers MR5 (Fig. 3) and MR5A (Fig. 1) then conduct, thus disabling the pulse application to these tubes, and busying the line finder formed by these tubes. Hence a line finder has been seized, and with it a cord circuit extending to a first selector formed by tubes FSA and FSB (Fig. 4). The equipment labelled "Call Control Section of Cord Circuit" now functions in the manner described in above-mentioned application of Bray et al., Serial No. 458,934, to select a free register, and this, via, the primary winding PW1 of transformer TF4 returns dial tone to the calling subscriber.

The calling subscriber then dials, and on the first impulse of the first digit breaks the loop. The gate G1 is therefore re-opened, and pulses P1 and P2 are sent via G1 over the phantom circuit to the line finder for the duration of the break impulse. The pulses are detected in the line finder, where they may be used to control the timing device under whose control the connection is broken down if the loop is broken for an excessive period. This timing device is not described as the principles of its operation are well known in the art. Further the line finder circuit selects P1 out of the P1 and P2 pulses which reach it and gates it to the register and first selector, as will be described.

Turning now to Figs. 3 and 4, which show the line finder, cord circuit and first selector, the detection arrangement for P1 pulses includes a transistor gate G2.

In the normal state, i.e. with no gaps of LFA and LFB discharging, there is no potential drop across R6, so the base of G2 is at a potential which is positive to earth due to current flowing through resistor R7, rectifier MR6 and resistor R8 and R6. Since the emitter is at −20 volts, which is applied thereto via a winding of transformer TF6, G2 is maintained non-conductive. When a gap in each of LFA and LFB is fired on seizure of the line finder, current flow through R6 causes the potential on the base of G2 to go negative to about −15 volts. Since the base is still positive with respect to the emitter, G2 remains non-conductive. It will be remembered that on seizure a free register is seized. This is done, in the manner described in the Bray et al. application, Serial No. 458,934, by the call Control Section of the Cord Circuit as a result of the change of potential across R6 due to seizure. As has already been mentioned this causes dialling tone to be sent to the calling subscriber via winding PW1 of transformer Tf4. When the subscriber dials, it will be remembered that G1 (Fig. 1) sends P1 and P2 pulses forward over the phantom circuit on the A and B wires for the duration of each dialled impulse. These pulses appear across R6 as negative pulses since, originally negative, they have been inverted by TF1 and again by their passage through LFA and LFB. Each of these pulses is of such a size as to bring the voltage of the base of G2 to about −30 volts, whereupon the gate is opened for the duration of each P1 pulse and each P2 pulse. Since only P1 pulses are applied to its collector, it will be seen that G2 only passes P1 pulses, which are phase inverted and sent forward over the phantom by transformer TF6. The pulses P1 (see Fig. 9), indicate that the calling subscriber's line is open circuited, and their frequency depends on the number of supervisory and control signals which need to be catered for. Hence if as in Fig. 9, each pulse lasts for 125 microseconds, and is spaced in time from the next pulse in the cycle by 125 microseconds, and there are n signals to be dealt with, the full cycle is 250n microseconds. Hence several P1 pulses will occur during each break impulse.

Returning to Fig. 3, the P1 pulses as well as being sent on to the phantom by G2 are sent over lead L1 to the call control circuitry. To pass the dialling intelligence to the register the bistable pair of transistors T1—T2 is used. The operation of this type of bistable pair is fully described in the copending application, Serial No. 471,458, which was filed by Odell et al. on November 26, 1954. In the idle condition this has T2 conducting and T1 non-conducting which is ensured by a potential applied thereto over L2 on release. When the circuit is seized, as has already been described, negative potential occurs across R6. This is applied via lead L3 to rectifier MR7 of the base gate of T1, and the coincidence of this and the first locally-produced P1 pulse applied to rectifier MR8 causes T1 to conduct and, due to the common collector resistor R9, to render T2 non-conductive. At this time the P1, P2 pulses are not being sent.

When the first dialled impulse arrives, it will be remembered that G1 commences to gate P1 and P2 pulses to the line finder circuit, where they are developed across R6. The gate G2 functions to separate P1 pulses, which are applied to the primary of TF5. Hence positive P1 pulses are applied to T1, which prevent it from being affected by these pulses. The first of these P1 pulses, via L1 and rectifier MR9 causes a coincidence with a local P1 pulse, so that T2 is triggered to its conducting condition, which because of R9 renders T1 non-conductive. As long as G2 passes P1 pulses T2 remains conducting, and the potential developed across R10 in its emitter circuit is applied via lead L4 to the call control sections, and from thence to the seized register. When the impulse ends, G2 passes no more P1 pulses and T1 is once again brought to its conductive condition, as described above, which switches T2 off. The emitter resistor of T1 is also connected to the call control circuitry.

Further dialled impulses are repeated to the register in the same manner. In the case of a local call the register stores the dialled digits, and then functions to set up the connection in the manner described in the copending application of Bray et al., Serial No. 458,934, filed September 28, 1954. It is assumed that the first digit of a number indicates whether or not it is an outgoing call, as in the system described in the above mentioned application. In any case, when sufficient digits have been received for the register to determine that the call is outgoing from the exchange, it seizes an outgoing junction in the appropriate direction and then releases itself. Subsequent dialled digits are then repeated through such of the selectors as are required to the junction.

In any case, the register seizes the appropriate outlet from FSA—FSB by a pulse applied over R11 (Fig. 5) to the individual anodes of FSA—FSB for that outlet. When this happens relay H (Fig. 5) operates, and at h1 transfers 200 volts from MR10 to MR11. The cathodes of the tubes GSA, GSB are therefore now primed, and when, in due course, the register operates, as already described for FSA—FSB, a pair or pairs, of gaps, one in each of GSA and GSB ionise. A relay corresponding to H in the next selector then operates to extend this marking forward. If an outgoing junction is seized directly via FSA—FSB, the operation will be as described later for Fig. 8.

In the meantime the potential across the relay H is detected by the gate transistor G3, and when this goes negative after the end of the pulse which fired the selected gaps, this transistor is rendered conductive. Therefore each P1 pulse during this condition is passed by G3 and applied via the transformer TF7 to the centre point of the transformer TF8 and so forward over the phantom. A similar circuit including G4 is used to send P2 back from the called party, as will be described later.

Outgoing call

In the case of an outgoing call, the junction shown in Fig. 8 is seized and relay HO operates. This circuit includes a bistable circuit T3—T4, of which T4 is normally conducting. When relay HO operates on seizure of the circuit, its contact $ho1$ changes over and applies negative potential to rectifier MR11A of the gate controlling the base of T3. Then as a result of a coincidence between this potential, a local P1 pulse, and the absence of P1 incoming, T3 is caused to conduct and to render T4 non-conducting. The absence of P1 incoming is an effective control potential for this gate, because P1 is inverted via TF8 to form a positive pulse, and so the connection via its secondary to the gate is at a negative potential in the absence of an incoming P1 pulse. When T3 conducts the relay A in its emitter circuit operates, and at $a1$ closes the forward loop. At $ho2$, relay HO also causes tube GT1 to be extinguished.

It will be remembered that P1 pulses are repeated forward over the loop from the calling subscriber during the break impulses. When the first P1 pulse reaches Fig. 8, it is applied to T3—T4 via TF8. As before, each P1 pulse, being applied to T3 as a positive pulse via TF8, effectively prevents these pulses from influencing T3. However, the first of these pulses is applied as negative pulse to rectifier MR12, which forms part of a gate controlling T4. Coincidence of this pulse and of a local P1 pulse renders T4 conducting and T3 non-conducting, so that relay A is released. At $a1$ this breaks the loop so that transmission of the first dialled impulse over the junction has commenced. When this dialled impulse ends, the supply of P1 pulses via TF8 is cut off, so once again T3 conducts, and switches T4 off. As before this operates relay A, which at $a1$ closes the forward loop. Thus the dialled impulses are repeated to the outgoing junction.

The relay D is effective to control backward supervision, since it causes P2 pulses to be returned via transformer TF9 while D is not operated, i.e. before answer, and while the called subscriber is clearing. The effect of the return of P2 pulses will be described later in connection with a local call.

At the end of the outgoing call, the H relays of each selection stage (i.e. H, HA, HO, etc.) through which the call was extended each releases the next forward stage. In the outgoing junction circuit the release of relay HO at $ho1$ renders T4 conductive, switching T3 off. Therefore relay A releases and breaks the loop at $a1$. This happens irrespective of conditions at the other end of the junction. The contact $ho2$ is reclosed, re-applying positive to the anode of tube $Gt1$. This tube fires when capacitor C1 has charged to a suitable trigger voltage, which will be after, say, 300 ms. Until T3 is fired, the outlet test pulses cannot be applied to the gap anodes for the junction, that is, the junction is busy as long as GT1 is non-conducting. This delay in removing the busy condition from the junction is intended to give the equipment at the remote end of the junction time to release.

Local call

In this case seizure of group selectors continues as has been described above and in the copending Bray et al. application, Serial No. 458,934. In due course the final selector is seized and the called line tested and seized if it is found to be free, as described in the above-mentioned copending application.

The final selector SFA—SFB which has been seized extends the connection via its individual anode gaps to a circuit, such as is shown in Fig. 1, this circuit being "entered" from Fig. 7 on the right-hand side of Fig. 1.

Reverting to Fig. 6, the final selector circuit includes a bistable pair of transistors T5—T6, which normally has T6 conducting and T5 non-conducting if the called line is idle. As will be described, if the final selector is engaged, T5 will have become conducting when the called line for which the circuit is engaged answered. Since T6 is conducting, a positive potential is therefore present on its emitter, and this is applied to rectifier MR15, which is connected via resistor R15, to the base of a gate transistor G5. The ring control interruptor pulses, which have a pulse repetition rate of 20 c.p.s., i.e one per 50 ms., are applied to rectifier MR16. Hence the gate connected to the base of G5 enables GF5 once per 50 ms. Hence once in every 50 ms. the gate formed by G5 opens and P4 pulses are passed by G5.

The P4 pulses passed by G5 are applied via transformers TF10 and TF11 and the gaps of SFA—SFB to the called subscriber's line circuit, which will be similar to Fig. 1. This circuit includes a bistable transistor pair T7—T8, of which T8 is normally conducting. The reception via a final selector of a P4 pulse, which is developed across R16 causes this P4 pulse to be applied to rectifier MR17. This, with a local P4 applied to MR18 causes the base gate of T7 to open. Therefore T7 conducts and T8 is rendered non-conducting.

When T7 conducts, relay RG in its emitter circuit is operated and at $rg1$ and $rg2$ connects the ringing generator GRR to the called subscriber's line. It will be remembered that normally the gate G1 of a subscriber's line unit (Fig. 1) passes P1 and P2 pulses to the phantom circuit extending to the final selector serving that line. These pulses pass through the seized final selector FSA—FSB and are developed across resistor R17 therein. The gate transistor G6 has P2 pulses applied to its collector, and so it passes P2 pulses, which are applied via transformer TF12 to the phantom circuit extending to the calling subscriber.

Each group selector circuit includes a gate, such as G4, Fig. 5. When the P2 pulse reaches this stage, it is developed across resistors R18 therein and the coincidence of this with the local P2 applied to the collector of G4 causes G4 to pass a P2 pulse, which is applied to the phantom circuit via transformer TF13. In due course this pulse reaches the cord circuit (Figs. 3 and 4) where it is applied to T10—T11, the result of this being described later.

When the called subscriber replies and lifts his receiver, the loop is completed and a negative potential is developed across resistor R19 in his line circuit (Fig. 1). The coincidence of this negative potential and a negative peak of the ringing cycle, and any P pulse causes the base gate of T8 to render T8 conducting, which causes T7 to become non-conducting and release RG. Hence RG changes its contacts over and the connection is established.

As a result of the closure of the loop at $rg1$ and $rg2$ and at the called subscriber, the gate G1 of the called subscriber line circuit is closed so that P1 and P2 pulses are no longer sent to the ringing control bistable circuit in the final selector circuit of Fig. 6. This causes T5 to conduct, because the prevention of G6 from passing P2 pulses has the result that the inverted P2 pulses previously applied to the base gate of T5 are no longer applied. The pulses which previously reached this gate via transformer TF10 as positive pulses inhibited this gate. The gate now responds to a coincidence of a local P2, the absence of this inverted pulse (TF13 being connected at the other end of its secondary to negative), and a negative potential across R17 as a result of the fired final selector gaps. The output from the gate causes T5 to conduct and T6 to become non-conducting. Therefore the gate G5 is closed.

The return to normal of the ringing control circuit in Fig. 6 occurs if the relay RG releases before a P4 pulse can get to T7. Normally this is possible since the P4 pulses which reach T7 are separated by 50 ms. If, however, the operation of T8 occurs at P3, T7 promptly re-operates at T4. However, the pulse immediately following this P4, which will be P1 or P5, if a P5 is used, re-operates T7. The next P4 will not reach T7 for 50 ms., so that there is ample time for RG to change over its contacts.

When the connection is broken down at the end of the call, relay HH (Fig. 6) releases, as is normal, and at hh2 re-operates T6 so that the circuit is ready to deal with the next call.

In the line finder circuit (Fig. 4), T10 is conducting in the idle condition because in that condition negative is applied to its base wire r11 and MR20. T11 cannot conduct because of the absence of received P2, since earth is then applied to MR21, which disables the base gate of T11. However, when the first P2 pulse is received from the called line circuit the coincidence of this with a local P2 causes T13 to deliver an output, since r12 is closed by now, which with P2 from transformer TF14, which also supplies T13, and a further local P2 pulse, causes T11 to conduct. When this happens T10 is rendered non-conducting because of the common collector resistor.

As has been indicated, the output from the emitter circuit of T11 can be used to control subscriber's metering equipment. It will be noted that as long as T10 is conducting, i.e. before a called subscriber answers, the gate G8 is open to P3 pulses which are applied to the phantom via TF15. P3 pulses can be used for supervision of a call by an operator. At the end of the call, T11 is rendered non-conducting by the opening of r12. T10 re-operates when r11 closes at the end of the call. The operation of this relay is fully described in the copending Bray et al. application, Serial No. 458,934.

*Second embodiment Figs. 10–12*

This arrangement is fundamentally similar to the arrangement already described except that signal detection and regeneration are not performed at intermediate stages of the connection. Thus the signalling is end-to-end. It has been found that, since the attenuation per stage is low, pulses can be passed through as many as six intermediate stages without appreciable distortion. Fig. 10 shows one end of the system, the calling party end, Fig. 11 is a typical intermediate stage, and Fig. 12 is a terminating stage. The circuit of Fig. 10 would normally be reached, as indicated, from a line finder, while that of Fig. 12 would normally extend to a final selector. It will be noted that the gas gap selector tubes are represented schematically as if each is a single tube, such as described in the copending application, Serial No. 347,486, filed April 8, 1953.

When a line finder has been seized, the call is extended to the circuit shown in Fig. 10 in the manner already described in the copending application, Serial No. 458,934. Then mark potential is applied via resistor R30, R31 and R32 to the common cathode of the tubes FSA, FSB forming the first selector. Thus this selector has been primed. At the same time, the register (not shown), causes dialling tone to be sent to the calling subscriber, who thereupon dials. The dialled digits are stored in the register, which thereupon seizes an outlet in the wanted direction by energising the individual anodes for a suitable free outlet via a resistor such as R33 (Fig. 11). Relay HA operates and at ha1 primes the next selector, and the gaps of selector tubes FSA, FSB for the seized outlet are ionised. Subsequent selections occur similarly under control of the register.

For convenience in description it is assumed that three conditions have to be signalled from the calling subscriber's end, one of which could be dialled digits, and three from the called subscriber's end, one of which could be an indication that the called party is being rung but has not yet answered.

Considering first signalling from the calling subscriber's end, this uses a set of gate transistors G15, G16, G17, the set being provided one per line-finder-first-selector-cord circuit. Each gate transistor has pulses occurring in one time position in the cycle applied to its collector, G15, G16, and G17 having P1, P3 and P5 negative pulses applied to their respective collectors.

When a condition to be sent exists, a negative potential is applied to the base of the gate transistor appropriate to that condition. This is represented schematically in Fig. 10 by the closure of a relay contact. Thus to signal the condition represented by P1, contact As closes to open the gate G15, which then applies P1 pulses to the phantom circuit via transformer TF25. These pulses are signalled forward through the gas gaps. At each stage they leave the phantom circuit, and by-pass the main speech path transformer via transformers such as TF26 (Fig. 11). Finally these signals reach the end of the system, which in the present case is a circuit associated with a final selector. For each type of signal to be received at the termination there is a bistable pair of transistors, such as T21—T22 for P1 (Fig. 12). Normally this has T22 operated, since its base gate has P1 applied locally via MR50 and negative potential applied to MR51 via a winding of transformer Tf27. Hence normally T22 is conducting.

Still referring to Fig. 12, when a P1 pulse arrives, it is applied to MR51 as a positive pulse so that the gate controlling T22 is disabled. However, this pulse is applied by TF27 to MR52 of the base gate of T21 as a negative pulse, and since P1 is applied to MR53 of this gate, the gate delivers an output. When this output occurs, T21 conducts and because of the common collector resistor renders T22 non-conducting. When T21 conducts, relay AR in its emitter circuit is operated, so that contact ar1 is closed, thereby indicating that P1 has been received.

Since each P1 inhibits the gate of T22, it will be seen that T21 conducts, and AR is operated as long as the conditions represented by P1 persists.

Transmission from the final selector end, Fig. 12, uses pulses P2, P4, P6; these being controlled by respective gates which are opened by contacts XS, YS and ZS respectively. Corresponding receiving bistable pairs controlling relays XR, YR and ZR are shown in Fig. 10.

Although all receiving units are shown at the ends, any one could be at an intermediate stage if necessary, or even two or more receiving units could be provided for a conductor. The same possibilities exist in the case of the sending units.

While the principles of the invention have been described above in connection with specific embodiments, and particular modifications thereof, it is to be clearly understood that this description is made only by way of example and not as a limitation on the scope of the invention.

What we claim is:

1. A signalling system for use in an automatic telecommunication exchange having a line finder stage and a plurality of selector stages successively coupled to the output of said line finder stage, said system comprising means for producing pulses at different time positions in a repetitive cycle of time positions, each pulse representing a condition to be signalled, a communication path including a phantom circuit comprised of a pair of speech wires and a ground, means for applying a selected one of said pulses to said phantom circuit, and means at each selecting stage responsive to said transmitted pulse for repeating said pulse to the next successive stage.

2. A signalling system, as defined in claim 1, in which the repeating means comprises a transistor transmitting circuit responsive to the receipt of a particular pulse for retransmitting said pulse.

3. A signalling system, as defined in claim 1, in which there is a separate repeating means at each stage for each pulse representing a condition to be signalled, said separate repeating means being responsive only to that particular pulse and no other.

4. A signalling system, as defined in claim 1, in which a plurality of subscribers' line circuits are provided, and in which each line circuit includes a means for transmitting the pulses, further comprising means in each line circuit for blocking the transmitting means for a particular pulse when that line circuit is in a calling condition, and means for releasing said blocking means during the interval of each dial pulse received from that line circuit.

5. A signalling system, as defined in claim 4, in which the line finder stage comprises a line finder circuit adapted to be connected to a calling line circuit, said line finder circuit comprising a bistable circuit having a normal first condition of operation and a second condition of operation in which it is adapted to be set by the receipt of a predetermined potential, means in each line circuit responsive to the calling condition of the associated line for delivering said predetermined potential via said line finder circuit to said bistable circuit to set it in its second condition, means responsive to the receipt of the particular pulse from the transmitting means in the line circuit for counteracting the effect of said predetermined potential and for causing said bistable circuit to return to its first condition of operation for the duration of said particular pulse, whereby when said particular pulse ends, said bistable circuit returns to said second condition of operation under control of said predetermined potential, and means for transmitting a signal each time said bistable circuit assumes its second condition of operation.

6. A signalling system, as defined in claim 1, in which the successive stages include a final selector circuit comprising means for transmitting a different one of the pulses to a selected line circuit, means in each line circuit for detecting said different one of the pulses and means operated by said detecting means for causing a ringing operation on the line associated with said line circuit.

7. A signalling system, as defined in claim 6, in which the detecting means comprises a bistable circuit having a first condition of operation in which it is normally set and a second condition in which it is set in response to the receipt of a different one of the pulses, and in which the means for causing a ringing operation comprises a ringing generator, and means responsive to said bistable circuit being in its second condition of operation for connecting said generator across the line associated with said line circuit, and further comprising means responsive to the completion of the circuit through said line when the called subscriber answers for restoring said bistable circuit to its first condition whereby said connecting means is disabled so as to disconnect said generator from said line.

8. A signalling system, as defined in claim 5, in which each line finder and selector stage comprises gas discharge gaps for completing the communication path.

References Cited in the file of this patent

UNITED STATES PATENTS

| | | |
|---|---|---|
| 2,387,018 | Hartley | Oct. 16, 1945 |
| 2,490,833 | Ransom | Dec. 13, 1949 |
| 2,638,505 | Van Mierlo et al. | May 12, 1953 |
| 2,773,934 | Trousdale et al. | Dec. 11, 1956 |